United States Patent [19]

McAfee et al.

[11] Patent Number: 5,373,028

[45] Date of Patent: Dec. 13, 1994

[54] POLYURETHANE FOAMS HAVING REDUCED VISIBLE EMISSIONS DURING CURING

[75] Inventors: Carl D. McAfee; Richard G. Skorpenske; Don H. Ridgway; Stephen K. Lewis; Eugene P. Wiltz, Jr., all of Lake Jackson, Tex.

[73] Assignee: The Dow Chemical Company, Midland, Mich.

[21] Appl. No.: 137,309

[22] Filed: Oct. 15, 1993

Related U.S. Application Data

[63] Continuation-in-part of Ser. No. 802,070, Dec. 3, 1991, abandoned, which is a continuation-in-part of Ser. No. 747,549, Aug. 20, 1991, abandoned.

[51] Int. Cl.$^5$ .................................................. C08G 18/00
[52] U.S. Cl. .................................. 521/99; 521/103; 521/106; 521/107; 521/117; 521/118; 521/120; 521/121; 521/123; 521/130; 521/133
[58] Field of Search .............. 521/99, 103, 106, 107, 521/117, 118, 120, 121, 123, 128, 130, 133

[56] References Cited

U.S. PATENT DOCUMENTS

| | | | |
|---|---|---|---|
| 2,846,408 | 8/1958 | Brochhagen et al. | 521/107 |
| 2,948,691 | 8/1960 | Windemuth et al. | 521/107 |
| 3,325,421 | 6/1967 | Muller | 521/107 |
| 3,383,243 | 5/1968 | Gioia | 521/107 |
| 3,452,056 | 6/1969 | Sundholm | 521/107 |
| 3,461,086 | 8/1969 | Mogford et al. | 521/107 |
| 3,505,225 | 4/1970 | Wheeler | 521/107 |
| 3,560,544 | 2/1971 | Halaska | 521/107 |
| 3,654,370 | 4/1972 | Yeakey | 521/107 |
| 3,655,559 | 4/1972 | Holt | 521/107 |
| 3,751,392 | 8/1973 | Olstowski | 521/107 |
| 3,804,782 | 4/1974 | Demon et al. | 521/107 |
| 3,887,500 | 6/1975 | Prakai et al. | 521/107 |
| 3,896,062 | 7/1975 | Morehouse | 521/107 |
| 3,945,939 | 3/1976 | Barron | 521/107 |
| 3,957,842 | 5/1976 | Prokai et al. | 521/107 |
| 3,966,650 | 6/1976 | Prokai | 521/107 |
| 4,042,537 | 8/1977 | Dahm et al. | 521/107 |
| 4,048,102 | 9/1977 | Quock et al. | 521/107 |
| 4,077,807 | 3/1978 | Kramer et al. | 521/107 |
| 4,089,835 | 5/1978 | König et al. | 521/107 |
| 4,097,400 | 6/1978 | Wortmann et al. | 521/107 |
| 4,098,730 | 7/1978 | Hilterhaus et al. | 521/107 |
| 4,130,697 | 12/1978 | Stern et al. | 521/107 |
| 4,172,825 | 10/1979 | Shook et al. | 521/107 |
| 4,233,425 | 11/1980 | Tefertiller et al. | 521/107 |
| 4,303,564 | 12/1981 | Kuroshima et al. | 521/107 |
| 4,305,857 | 12/1981 | Reischl | 521/107 |
| 4,305,858 | 12/1981 | Reischl | 521/107 |
| 4,310,448 | 1/1982 | Reischl | 521/107 |
| 4,310,449 | 1/1982 | Reischl | 521/107 |
| 4,324,716 | 4/1982 | Reischl et al. | 521/107 |
| 4,336,341 | 6/1982 | Fujiwara et al. | 521/107 |
| 4,374,209 | 2/1983 | Rowlands | 521/107 |
| 4,394,491 | 7/1983 | Hoffman | 521/107 |
| 4,407,983 | 10/1983 | Gerkin | 521/107 |

FOREIGN PATENT DOCUMENTS 0005470 11/1979 European Pat. Off. .

(List continued on next page.)

OTHER PUBLICATIONS

Dwyer, F. J. et al. in "Technology of Supersoft Flexible Urethane Foams", *SPI Proceedings*, Sec. 3c, pp. 1–5, (1963).

(List continued on next page.)

*Primary Examiner*—Maurice J. Welsh
*Attorney, Agent, or Firm*—Barbara J. Tribble

[57] ABSTRACT

In a method of preparing a poly-urethane and/or -urea foam from a formulation including (a) a polyisocyanate, (b) an isocyanate-reactive component, and (c) a visible emissions producing component, wherein (a), (b) and (e) are reacted under reaction conditions sufficient to form a poly-urethane and/or -urea foam and the foam is then cooled, whereby visible emissions are emitted during cooling, an improvement comprising including in the formulation a visible emissions reducing agent, such that the amount of the visible emissions is reduced as compared with the amount emitted by a foam prepared from a formulation which does not contain the visible emissions reducing agent but which is otherwise substantially similar. Foams prepared therefrom exhibit reduction in visible emissions during the cure period, which is particularly evident when the foams are mechanically cooled. They also exhibit generally good physical properties.

12 Claims, No Drawings

U.S. PATENT DOCUMENTS

| | | | |
|---|---|---|---|
| 4,451,255 | 5/1984 | Bujan et al. | 521/107 |
| 4,451,588 | 5/1984 | Speranza et al. | 521/107 |
| 4,460,715 | 7/1984 | Hoffman et al. | 521/107 |
| 4,463,107 | 7/1984 | Simroth et al. | 521/107 |
| 4,468,478 | 8/1984 | Dexheimer et al. | 521/107 |
| 4,469,820 | 9/1984 | Dexheimer et al. | 521/107 |
| 4,478,959 | 10/1984 | Bechara et al. | 521/107 |
| 4,584,253 | 4/1986 | Lin et al. | 521/107 |
| 4,595,743 | 6/1986 | Laughner et al. | 521/107 |
| 4,599,286 | 7/1986 | Limburg et al. | 521/107 |
| 4,652,589 | 3/1987 | Simroth et al. | 521/107 |
| 4,686,240 | 8/1987 | Bailey, Jr. et al. | 521/107 |
| 4,738,991 | 4/1988 | Narayan | 521/107 |
| 4,749,129 | 6/1988 | Hanson | 521/107 |
| 4,772,750 | 9/1988 | Habermann | 521/107 |
| 4,775,588 | 10/1988 | Ishii et al. | 521/107 |
| 4,814,359 | 3/1989 | Baker et al. | 521/107 |
| 4,837,259 | 6/1989 | Chucta | 521/107 |
| 4,847,072 | 7/1989 | Bissett et al. | 521/107 |
| 4,847,416 | 7/1989 | Durvasula et al. | 521/107 |
| 4,883,825 | 11/1989 | Westfall et al. | 521/107 |
| 4,914,137 | 4/1990 | Smith et al. | 521/107 |
| 4,943,597 | 7/1990 | Grünbauer et al. | 521/107 |
| 4,950,694 | 8/1990 | Hager | 521/107 |
| 4,968,724 | 11/1990 | Mascioli | 521/107 |
| 4,970,243 | 11/1990 | Jacobs et al. | 521/107 |
| 4,981,880 | 1/1991 | Lehmann et al. | 521/107 |
| 4,999,383 | 3/1991 | Blount | 521/107 |
| 5,010,113 | 4/1991 | Blount | 521/107 |
| 5,011,908 | 4/1991 | Hager | 521/107 |
| 5,037,860 | 8/1991 | Parrish et al. | 521/107 |
| 5,053,316 | 10/1991 | Suzuki et al. | 521/107 |
| 5,128,379 | 7/1992 | Stone | 521/107 |
| 5,171,756 | 12/1992 | Ricciardi et al. | 521/107 |
| 5,188,792 | 2/1993 | Drye et al. | 521/107 |
| 5,218,008 | 6/1993 | Parrish | 521/107 |

FOREIGN PATENT DOCUMENTS

| | | |
|---|---|---|
| 0095653 | 12/1983 | European Pat. Off. . |
| 0138102 | 4/1985 | European Pat. Off. . |
| 0296449 | 12/1988 | European Pat. Off. . |
| 0309218 | 3/1989 | European Pat. Off. . |
| 0322912 | 7/1989 | European Pat. Off. . |
| 0410467 | 1/1991 | European Pat. Off. . |
| 0482476 | 4/1992 | European Pat. Off. . |
| 2046310 | 3/1971 | Germany . |
| 3323872 | 1/1985 | Germany . |
| 3819940 | 12/1989 | Germany . |
| 61-26617 | 2/1986 | Japan . |
| 2272012 | 11/1990 | Japan . |
| 900085 | 7/1962 | United Kingdom . |
| 1462859 | 1/1977 | United Kingdom . |

OTHER PUBLICATIONS

Armistead, G. L. et al. in "J. Appl. Sci.", vol. 35, pp. 601–629, (1988).
Hicks, J. S. et al., in "Proceedings of the SPI-33rd Annual Technical/Marketing Conference", pp. 348–355, (1990).
Turner, R. B. et al., in "J. Cellular Plastics", vol. 25, pp. 117–124, (1989).
Priester, R. D. et al., in "Proceedings of the SPI-33rd Annual Technical/Marketing Conference", pp. 527–539, (1990).
Brandrup J. and E. H. Immergut, "Polymer Handbook", 3rd Edition, Part VII, p. 523, (1989).
Pendse and Karrer, *Helv. Chim. Acta* 40, 1837 (1957).
Schudel et al., *Helv. Chim. Acta* 46, 2517 (1960).
Scott et al., *Helv. Chim. Acta* 59, 290 (1976).
Barner and Schmid, *Helv. Chim. Acta* 62, 2384 (1979).
Green et al., *J. Chem. Soc.*, p. 3374, (1959).
Berger et al., *J. Chem. Soc.*, p. 1382, (1938).
Cohen et al., *J. Org. Chemistry*, vol. 41, p. 3505, (1976).
Chemical Abstracts 56276n (JP 51–027710).
Derwent Abstract 81–70110D/39 (EP 35677).
Derwent Abstract 89–000943/01 (EP 0296449).
Derwent Abstract 85–099820/17 (EP 0138102).
Derwent Abstract 85–007379/02 (DE 3323872).
Derwent Abstract 86–078200/12 (JP 61-26617).
Derwent Abstract 90–373572/50 (JP 2-272012).
Derwent Abstract 86–316247/48 (JP 61-235418).
Derwent Abstract 79–17112B/09 (JP 54–010108).
Derwent Abstract 87–147658/21 (JP 62-086036).
Derwent Abstract 85–186044/31 (JP 60-112847).
Derwent Abstract 83–846853/51 (JP 58-191733).
Derwent Abstract 83–713428/29 (JP 58-096638).
Derwent Abstract 83–33612K/14 (JP 58-034843).
Derwent Abstract 80–81704C/46 (JP 55-127454).
Derwent Abstract 79–51375B/28 (JP 54-066994).
Derwent Abstract 79–44760B/24 (JP 54-055043).
Derwent Abstract 79–32151B/17 (JP 54-034352).
Derwent Abstract 84-071633.

POLYURETHANE FOAMS HAVING REDUCED VISIBLE EMISSIONS DURING CURING

CROSS REFERENCE TO RELATED APPLICATIONS

This is a continuation-in-part application of U.S. application Ser. No. 07/802,070, filed Dec. 3, 1991, which is a continuation-in-part application of U.S. application Ser. No. 7,747,549, filed Aug. 20, 1991, both of which are incorporated herein by reference in their entirety are now abandoned.

BACKGROUND OF THE INVENTION

The present invention relates to polyurethane polymers. More particularly, the present invention relates to polyurethane foams having reduced visible emissions during processing, as well as improved physical properties.

Flexible polyurethane foams are commonly prepared for a variety of commercial uses. Such uses include packaging, insulation, cushioning, carpet underlay and the like. For these purposes it is desirable for the foams to exhibit good load bearing capability, resiliency, tensile strength and tear strength, in order to meet acceptable performance and durability standards. Flexible polyurethane foams may be produced by either slab foam or molded processes. Slab foams are produced in large buns which, after curing, are sliced or otherwise formed into useful shapes. For example, carpet underlay can be prepared in this manner. In contrast, molding is used to directly produce foam objects in essentially their final shape and form. Automotive seating and some furniture cushioning are commonly molded.

Currently flexible polyurethane foams are most often prepared by the well-known "one-shot" technique, in which the starting materials are reacted and foamed in one step. The starting materials usually include a polyol, a polyisocyanate, one or more catalysts and surfactants and, as a blowing agent, water. Auxiliary blowing agents such as highly volatile halocarbon compounds are also frequently used.

One commonly used component of many polyurethane foams is one or more antioxidants. Antioxidants are generally defined to mean any material added to a foam formulation to improve the resistance of the foam to oxidative type reactions. Such reactions, occurring mainly during the cure and cooling phase of processing due to the exothermic nature of the foam-forming reaction, tend to result in discoloration of the foam, also called "scorch". Because this discoloration reduces the commercial acceptability of the final product, one or more antioxidants is generally employed in most formulations. Antioxidants also play a part in reducing discoloration over time, often exhibited as a "yellowing" of the foam, and in maintaining physical properties that are lost due to the general degradation of the foam during the curing period or during ageing.

However, a particular problem encountered in polyurethane foam processing is the generation of visible emissions, particularly during mechanical cooling. These emissions, often in the form of a white or gray "smoke", are most frequently seen when certain antioxidants are used in preparation of the foam, but may also occur under other circumstances, when certain types of other materials are included in formation of the foam. Because such emissions frequently result in violation of air quality regulations and standards with resultant penalties, a means of eliminating or reducing the visible emissions, while at the same time maintaining foam physical properties and overall quality, is needed in the art.

SUMMARY OF THE INVENTION

Accordingly, the present invention provides such a means. In one aspect the invention is a method of preparing a flexible poly-urethane and/or -urea foam having reduced visible emissions during cooling comprising (1) reacting (a) an organic polyisocyanate, (b) an isocyanate-reactive compound, (c) a visible emissions reducing agent, and (d) a visible emissions producing component, under reaction conditions suitable to form a flexible poly-urethane and/or -urea foam, and (2) cooling the foam. The formulation can, in preferred embodiments, further comprise a blowing agent such as water. The visible emissions reducing agent can be selected from, for example, (a) alkali metal dihydrogen phosphates and polyphosphates; (b) alkali metal sulfates; (c) aluminum sulfates, phosphates, polyphosphates, borates and alkanoates; (d) ammonium sulfates, phosphates, polyphosphates, borates and alkanoates; (e) acid chlorides; and (f) mixtures thereof. Other typical polyurethane formulation components, which do not constitute visible emissions producing components as hereinafter defined, can also be employed in the formulations of the present invention. The foam may be a slabstock or molded flexible foam.

The present method is also an improvement to a method of preparing a poly-urethane and/or -urea foam from a formulation including (a) a polyisocyanate, (b) an isocyanate-reactive component, and (c) a visible emissions producing component, wherein (a), (b) and (c) are reacted under reaction conditions sufficient to form a poly-urethane and/or -urea foam and the foam is then cooled, whereby visible emissions are emitted during cooling, this improvement comprising including in the formulation a visible emissions reducing agent, such that the amount of the visible emissions is reduced as compared with the amount emitted by a foam prepared from a formulation which does not contain the visible emissions reducing agent but which is otherwise substantially similar.

Surprisingly, the polymer compositions of present invention, containing the combination of a visible emissions producing component as well as the visible emissions reducing agent described, show substantially reduced visible emissions upon cooling, particularly mechanical cooling, when compared with equivalent foams prepared with the same visible emissions producing component but without the visible emissions reducing agent. As an added advantage, many of these foams also show significant improvements in other physical properties, such as resiliency, load-bearing, tensile strength and tear strength, and good processability in general.

DESCRIPTION OF THE PREFERRED EMBODIMENTS

The formulations of the present invention require two key components, in combination with other commonly-employed starting materials for preparing polyurethane and related foams as described. These key components are (1) at least one visible emissions producing component; and (2) at least one visible emissions reducing agent. Because of the key nature of these two formulation components, they will be described first.

As defined herein, a "visible emissions producing component" is a formulation component, such as an antioxidant, surfactant, catalyst, or other material or combination of materials, which, under the reaction conditions employed, includes one or more compounds which are not, and do not become, covalently bound to the polymer matrix and which are therefore capable of being emitted from the foam during cooling as a visible emission; or, alternatively, the visible emissions producing component may not itself be the sole source of such visible emissions, but may be a reactant which, when contacted with one or more other formulation components, enables production of such a compound. One type of formulation component most frequently identified as a source of such non-bound, or volatile, compounds is the antioxidant, which is a common component of polyurethane formulations in general. However, it should be kept in mind that other common formulation components, such as surfactants, catalysts and the like, may also operate as visible emissions producing components, and that therefore their inclusion in a formulation containing the visible emissions reducing agent, whether or not an antioxidant is present, may represent an embodiment of the present invention.

The antioxidants included herein may be advantageously any commonly employed by or otherwise known to those skilled in the art. Since the mode of operation of most antioxidants is to stop the chain breaking reaction of the polymer which is initiated by oxygen, allowing decomposition to hydroperoxides, sterically hindered phenols and secondary aromatic amines, alone or in combination with thioethers, phosphites or phosphines, are among the many antioxidants which may be used in practice of the present invention. Examples of the hindered phenols include 2,6-di-t-butyl-4-hydroxytoluene (which is the same as 2,6-di-t-butyl-4-methyl phenol), commonly called BHT, 2,4-dimethyl-6-octyl phenol, 2,6-di-t-butyl-4-ethyl phenol, 2,6-di-t-butyl-4-n-butyl phenol, 2,2'-methylene bis(4-methyl-6-t-butyl phenol), 2,2'-methylene bis(4-ethyl-6-t-butyl phenol), 2,4-dimethyl-6-t-butyl phenol, 4-hydroxymethyl-2,6-di-t-butyl phenol, N-octadecyl-beta (3,5-di-t-butyl-4-hydroxylphenyl) proprianate, and mixtures thereof. Others include tris-(3,5-di-t-butyl-4-hydroxylbenzyl)isocyanurate, 3,5-di-t-butyl-4-hydroxyhydrocinnimic acid triester of 1,3,5-tris-(2-hydroxyethyl)-s-triazine-2,4,6-(1H,3H,5H)-trione (for example, Cyanox ™ 1760 available from American Cyanamid Corp.), 4,4'-butylidene-bis-(6-t-butyl-m-cresol), 2,2-bis[4-(2-(3,5-di-t-butyl-4-hydroxyhydrocimmimoyloxy)) ethoxyphenyl] propane, octadecyl-3,5-di-t-butyl-4-hydroxy hydrocinnimate (for example, Naugard ™ 76 or Irganox ™ 1076), 1,1,3-tris-(2-methyl-4-hydroxy-5-t-butylphenyl)-butane. Still others include tetrakis [3,5-di-t-butyl-4-hydroxyhydrocinnimate] (such as Irganox ™ 1010), and the 3,5-di-t-butyl-4-hydroxyhydrocinnimic acid ester of a mixture of $C_7$–$C_9$ alcohols (such as Irganox ™ L-135) or the corresponding diesters of polyethylene glycol or a polypropylene glycol.

It is preferred in this invention to use liquid antioxidants. Thus, those of the foregoing which are liquid or which can conveniently be made liquid, such as by melting, are preferred. However, high melting point solid antioxidants are also included within the scope of this invention.

When a hindered phenol is used as the sole antioxidant, it is advantageously used in an amount preferably from about 50, more preferably about 500, to about 10,000, more preferably about 9,000 parts per million (ppm). These amounts, especially the preferred amounts, are ordinarily used to stabilize polyethers, especially for polyurethanes applications. One of the most commonly used antioxidants is BHT, or a mixture of antioxidants of which BHT is the major component. Selection of BHT, or an antioxidant package containing BHT, for use in the present invention is of particular advantage in that it allows the foamer to enjoy the advantages of BHT, including low cost to obtain good antioxidant performance, while avoiding some of its well known drawbacks. These drawbacks include the fact that BHT is a solid under ambient conditions and is generally melted in order to incorporate it into a foam. BHT in melted form is very volatile and, hence, tends to increase visible emissions problems. It also tends to sublimate in the foam over time, which may result in discoloration of contacting material, such as a fabric or a plastic film. Preferably BHT is used in the present invention in an amount from about 500, more preferably about 3,000, to about 9,000, more preferably about 5,000 ppm.

Another antioxidant useful in the present invention is a 6-chromanol derivative, alone or in combination with one or more other antioxidants. As disclosed in U.S. Pat. No. 5,218,008, 6-chromanol derivatives are especially efficient antioxidants for polyethers. These derivatives inhibit the oxidation of the polyether and, thus, of the foam as efficiently as BHT-based antioxidant systems, at a substantially reduced level of use. This effect is particularly noticeable when the polyether is used in making polyurethane foam. The foam shows comparable or better physical properties and, in preferred embodiments, comparable or better color than foam made with much greater levels of BHT-based antioxidant systems. The use of the 6-chromanol derivative also permits the use of a liquid antioxidant which permits easier, more consistent metering in the polyether.

6-chromanol is generally represented by the structure:

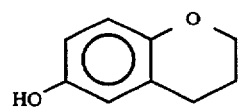

(I)

If a 6-chromanol derivative is selected, it is preferably a liquid. Derivatives which are liquid can be represented by the structure:

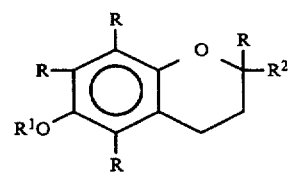

(II)

wherein each H is independently hydrogen or inertly substituted $C_{1-8}$ alkyl, preferably hydrogen or methyl. $R^1$ is such that it does not unduly interfere with the antioxidant activity of the derivative, and is preferably hydrogen or the residue after removal of an —OH group from (1) a mono or polycarboxylic acid or (2) a partially esterified polycarboxylic acid having at least one residual carboxylic acid group. Preferred are hydrogen, $C_{2-12}$ alkyl, carbonyl, or the residue of succinic acid or of succinic acid monopoly(ethylene glycol) ester. More preferred are hydrogen and methyl carbonyl (residue of acetic acid), and hydrogen is most preferred. $R^2$ is hydrogen or an inertly substituted hydrocarbyl group. The $R^2$ group is preferably an acyclic hydrocarbyl group, which can contain up to 20 carbon atoms or more, provided that the derivative is a liquid. The $R^2$ group can be saturated or contain one or more unsaturation sites. The $R^2$ group may be linear or branched. Two especially preferred $R^2$ groups are:

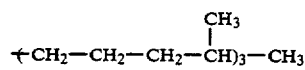

and

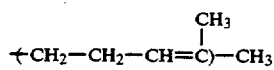

These groups appear on naturally occurring 6-chromanol derivatives.

When $R^2$ is structure III or IV, then it is preferred that the R group attached to the 2 carbon atom is methyl. Those derivatives wherein $R^2$ is structure III and the R group attached to the 2 carbon atom is methyl are most preferred. The derivative wherein $R^2$ is structure III, $R^1$ is hydrogen and the R attached to the 2 carbon atom is methyl is known as tocol, and has the structure:

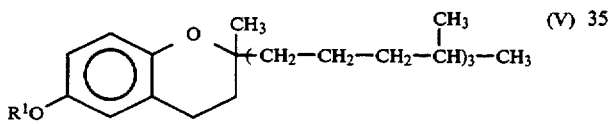

Tocol is conveniently prepared by condensing hydroquinone with phytol, as described by Pendse and Karrer, Helv. Chim. Acta 40, 1837 (1957).

In addition to tocol, the various tocopherol compounds are useful. Tocopherol compounds are 6-chromanol derivatives in which $R^2$ is structure III or IV, $R^1$ is hydrogen and the R attached to the 1 carbon atom is methyl. These include δ-tocopherol (2,8-dimethyl-2-(4,8,12-trimethyltridecyl)-6-chromanol), β-tocopherol (2,5,8-trimethyl-2-(4,8,12-trimethyltridecyl)-6-chromanol), Y-tocopherol (2,7,8-trimethyl-2-(4,8,12-trimethyltridecyl)-6-chromanol), α-tocopherol (2,5,7,8-tetramethyl-2-(4,8,12-trimethyltridecyl)-6-chromanol) which is also known as vitamin E, ζ₂-tocopherol (2,5,7-trimethyl-2-(4,8,12-trimethyltridecyl)-6-chromanol), ζ₁-tocopherol (2,5,7,8-tetramethyl-2-(4,8,12-trimethyl-3,5,7-tridecatrienyl)-6-chromanol) and ε-tocopherol (2,5,8-trimethyl-2-(4,8,12-trimethyl-3,5,7-tridecatrienyl)-6-chromanol). It will be appreciated that several of these tocopherol compounds have both d and l stereoisomers. In each instance, both the d and l isomers, or mixtures thereof, are useful.

Among the foregoing, tocol, δ-tocopherol, and α-tocopherol are more preferred on the basis of availability and antioxidant activity. Most preferred is α-tocopherol or a mixture of tocopherols of which α-tocopherol constitutes at least 50%, more preferably at least 80% by weight.

All tocopherol compounds mentioned above are available from natural sources. In addition, there are synthetic methods for making certain of these. These include: Green et al., J. Chem Sec. 1959, 3374; Schudel et al., Helv. Chim. Acta 46, 2517 (1960); Bergel et al., J. Chem. Sec. 1938, 1382; and GB 900,085 (1961), all of which are incorporated herein by reference in their entirety.

Other 6-chromanol derivatives can be prepared in a method analogous to the preparation of tocol. In general, these derivatives can be prepared according to the reaction of hydroquinone or ring-substituted hydroquinone with a 1-hydroxyalk-2-ene, such as can be represented by the structure:

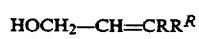

wherein R and $R^2$ have the meanings described before. This reaction can be represented as:

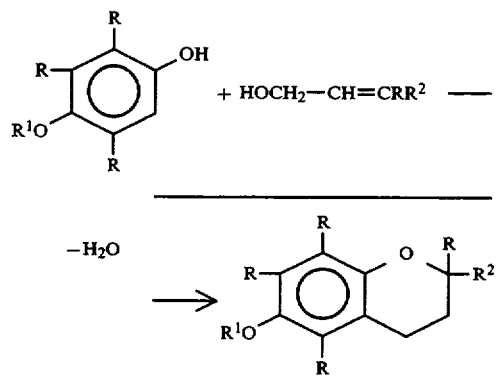

Other synthetic routes are described, for example, by Scott et al., Helv. Chim. Acta 59, 290 (1976), Cohen et al., J. Org. Chemistry 41, 3505 (1976), and Barrier and Schmid, Helv. Chim. Acta 62, 2384 (1979).

The 6-chromanol derivative is used in an amount sufficient to inhibit oxidation of the polyether. It is generally advantageous to use as little antioxidant as possible in order to reduce cost. Amounts of the 6-chromanol derivative up to about 5,000 ppm, based on weight of polyether, can be used, but the 6-chromanol derivative gives excellent results at low concentrations. Thus, a preferred amount of the 6-chromanol derivative is from about 50 to about 1,000 ppm. Further, the cost effective performance of the 6-chromanol derivative has been discovered to peak at concentrations between about 50 and about 300 ppm. Above about 300 ppm, the color stabilization of the polyether and polyurethanes made therefrom is often not further improved and sometimes decreased slightly. Thus, the most preferred amount of the 6-chromanol derivative is 50 to 300 ppm.

The 6-chromanol derivative is very effective at reducing the degradation of the polyether, but in performing this function, the 6-chromanol derivative itself degrades and forms colored degradation products. Thus, in making polyurethane foam, for example, the use of 6-chromanol alone often provides a foam having excellent physical properties but is nonetheless discolored. Accordingly, when discoloration is a particular problem, it is preferred to incorporate an additional antioxidant into the polyether, which inhibits the formation of colored degradation products of the 6-chromanol.

Another type of suitable antioxidant is a diaryl amine. Suitable such diaryl amines include those described, for example, in U.S. Pat. Nos. 3,452,056, 3,505,225, 3,655,559, 4,077,807, 4,837,259 and 4,914,137, all incorporated herein by reference in their entirety. Preferred are alkyl-substituted diaryl amines such as can be represented by the following structures:

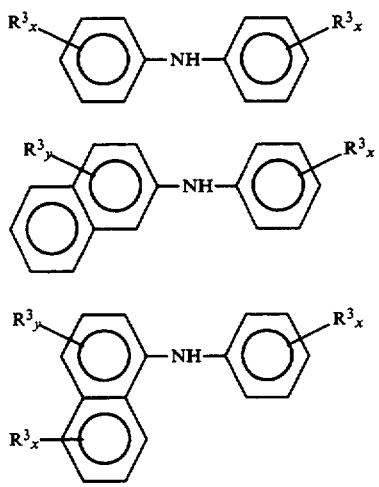

wherein each $R^3$ is alkyl, aryl-substituted alkyl or alkoxyl, each y is independently a number from 0 to 3 and each x is independently a number from 0 to 4. Each x and each y is preferably 0 or 1, more preferably The fused ring structures are less preferred. $R^3$ is preferably an alkyl or aryl-substituted alkyl group having a tertiary carbon atom which is preferably bonded to the aromatic ring at the position para to the amine group. In the foregoing, the aryl groups or the alkyl groups, or both, may be inertly substituted, such as by halogen or alkoxyl groups. As mentioned before, those diaryl amines which are liquid are particularly preferred. Also useful are ketone condensation products of any of the foregoing, particularly acetone condensation products. Exemplary commercial diaryl antioxidants include Naugard TM 445, Naugard TM A, Naugalube TM 438, Naugard TM J, Naugard TM 403, Naugard TM 431, Naugard TM 76 and Naugard TM 529, all available from Uniroyal Chemicals; and Irganox TM 5057 (reaction product of N-phenyl benzenamine and 2,2,4-trimethylpentene), from Ciba-Geigy Corporation. Preferred are Naugard TM 431, Irganox TM 5057 and Naugard TM 529 antioxidants.

The diaryl amine, when used, is advantageously present in an amount from about 10, preferably about more preferably about 60 to about 5,000 ppm, preferably about 3,000, more preferably about 200 ppm, based on the weight of polyether.

A fourth type of antioxidant is an organophosphite such as triphenyl phosphite, tridecyl phosphite, tris nonyl phenyl phosphite, phenyl diisodecyl phosphite and the like. Preferred is phenyl diisodecyl phosphite. This type of antioxidant is preferably used in conjunction with other antioxidants when the polyether is to be exposed to particularly high temperatures, and may be synergistic when combined with a hindered phenol in an antioxidant package. The organophosphites are advantageously used in amounts from about 20, preferably about 50, more preferably about 100 to about 2000, preferably about 500, more preferably about 200 ppm, based on weight of polyether.

Among preferred antioxidant packages suitable for use in the present invention as the visible emissions producing component are mixtures of a liquid hindered phenol, a liquid diphenyl amine, and a 6-chromanol derivative. This mixture can be prepared from any of the foregoing listed hindered phenol and diphenyl amine antioxidants, or may be a combination of a commercially available blend of a hindered phenol and a diphenyl amine with the selected 6-chromanol derivative. The most preferred antioxidant compositions are blends of commercial grade α-tocopherol, tocol or δ-tocopherol with about 0.5 to 5 parts of a liquid hindered phenol per part of α-tocopherol and 0.5 to 3 parts of a liquid diaryl amine antioxidant per part α-tocopherol, optionally further containing 0.5 to 3 parts of a phosphite antioxidant per part α-tocopherol. A particularly useful antioxidant mixture includes 1 part commercial grade α-tocopherol, 2 to 5 parts of Irganox TM 135 liquid phenol antioxidant, 0.5 to 2 parts Irganox TM L-5057 liquid diphenyl amine antioxidant, and 0.5 to 3 parts phenyl diisodecyl phosphite.

It is preferred to use purified antioxidants which themselves have low color, whenever color in the polyether is a significant concern.

The other key component of the present invention is a visible emissions reducing agent. This visible emissions reducing agent, in its broadest definition, is any material which, when combined in a polyurethane formulation containing the visible emissions producing component, reduces the amount of visible emissions emitted from the foam during the cooling process, when compared with the visible emissions level of a foam prepared from a formulation which is otherwise substantially similar but which lacks the visible emissions reducing agent. Without wishing to be bound by any particular mechanism as to the cause of such visible emissions reduction, it is hypothesized that the visible emissions reducing agent may complex with the visible emissions producing component, thus slowing production of the volatile, i.e., non-covalently bound, compounds: and/or the visible emissions reducing agent may complex with the compounds themselves.

The visible emissions reducing agent can preferably be selected from, for example, (a) alkali metal dihydrogen phosphates and polyphosphates; (b) alkali metal sulfates; (e) aluminum sulfates, phosphates, polyphosphates, borates and alkanoates; (d) ammonium sulfates, phosphates, polyphosphates, borates and alkanoates; (e) acid chlorides; and (f) mixtures thereof. Thus, the cation of the above-listed salts can be, for example, lithium, sodium, potassium, rubidium, cesium, francium, calcium, barium, strontium, radium, aluminum, ammonium or a mixture thereof. Species having more than one cation and/or more than one anion are also included within the visible emissions reducing agent selections. The term "ammonium" as used herein includes alkylammonium, arylammonium, and alkylarylammonium, as well as ammonium itself, and further encompasses mono-, di-, tri-, tetra- and penta-substituted species, such as diammonium tetraborate, diammonium pentaborate, mixtures thereof and the like. It is also to be understood that as used herein the term "phosphates" includes any compound having one phosphate moiety, and that "polyphosphates" includes any compound containing more than one phosphate moiety, e.g., phosphorates, phosphites, phosphonates, and phosphonites, as well as pyrophosphates. The term "sulfates" as used herein includes any compound having one or more sulfate moieties, e.g., sulfites, sulphonates, and sulphonites. Mixtures of any of the above combinations are also encompassed hereby, including mixtures of compounds included within a designated group and/or including compounds from one or more other designated groups. Specific examples of some of the species known to be effective include benzoyl chloride, aluminum sulfate, potassium dihydrogen phosphate, potassium hydrogen sulfate, mixtures thereof, and the like.

The visible emissions reducing agent and visible emissions producing component used in the present invention are incorporated into any effective, preferably water-blown flexible polyurethane foam formulation. Such formulations typically include a polyisocyanate. The polyisocyanate, which is preferably an organic polyisocyanate, can preferably be selected from those known in the art, generally including those aliphatic, aromatic, and cycloaliphatic polyisocyanates containing at least two isocyanate groups. For example, suitable polyisocyanates include hydrocarbon diisocyanates (e.g., the alkylene diisocyanates and the arylene diisocyanates such as toluene diisocyanate and derivatives thereof); triisocyanates; and polymethylene poly(phenylene isocyanates). Among these are 1,2-diisocyanatoethane, 1,4-diisoeyanatobutane, 2,4-diisocyanatotoluene, 2,6-diisocyanatotoluene, 3,5-diisocyanato-o-xylene, 4,6-diisocyanato-m-xylene, 2,6-diisocyanato-p-xylene, 2,4-diisocyanato-1-chlorobenzene, 2,4-diisocyanato-1-nitrobenzene, 2,5-diisocyanato-1-nitrobenzene, 4,4'-diphenylmethylene diisocyanate (MDI), 3,3'-diphenylmethylene diisocyanate, and poly(phenyleneisocyanates) having the general formula

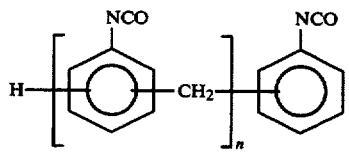

wherein n has an average value from 1.1 to 5 inclusive (preferably from 2.0 to 3.0). The preferred polyisocyanates are mixtures of 80 percent by weight of 2,4-toluene diisocyanate and 20 percent by weight 2,6-toluene diisocyanate (TDI), and mixtures of about 80 percent by weight TDI and about 20 percent by weight of a polymeric poly(methylene polyphenyleneisocyanate) of the formula:

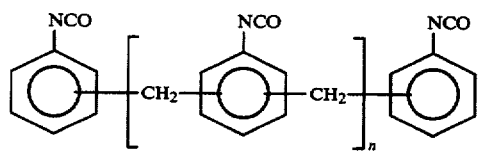

wherein n ranges from 0 to 2, and is preferably about 0.6. So-called "liquid MDI" is also included. In general, any isocyanates of the TDI type are preferred for use in the present invention.

In the practice of the present invention an isocyanate-reactive component is also employed. While water may be included in some embodiments of the present invention, it is to be understood that the term "isocyanate-reactive component" as used herein refers to compounds other than water which react with isocyanates, generally to form polyurethane, polyurea, or polyurethane/polyurea polymers. This isocyanate-reactive component is preferably a hydroxy-functional compound such as a polyol, and may be of the polyether or polyester type. Polyether polyols are preferred. In general any polyols typically employed in the art for preparation of flexible polyurethane foams are suitable, and can have hydroxyl numbers which vary over a relatively wide range, from about 10 to about 100, preferably from about 15 to about 85.

In a preferred embodiment of the present invention a polyol having a relatively high nominal functionality is employed. Such preference is attributable to the properties of the final foam. "Nominal functionality" as used herein refers to the number of reactive sites on the polyol's initiator, and thus is used with regard to a polyol in which there is a relatively large number of hydroxyl groups per molecule. Such is defined herein as having greater than or equal to about 3 hydroxyl functionalities per polyol molecule, preferably from about 3 to about 6, more preferably from about 3.1 to about 5, and most preferably from about 3.2 to about 4. It will be understood that the relatively high functionality refers to that of the entire isocyanate-reactive component, which may be a single isocyanate-reactive compound, e.g., a polyol, or a blend of related or unrelated isocyanate-reactive compounds. Thus, blends in which one or more compounds have functionalities of less than 3.0 are also suitable, but it is preferred that these blends include compounds having sufficient amounts of higher functionality compounds such that the blend as a whole has an average nominal functionality of greater than or equal to about 3. Preferably the selected relatively high functionality component includes at least one compound having an equivalent weight of at least about 400, more preferably from about 400 to about 10,000, and most preferably from about 1,000 to about 10,000. Polyols having lower nominal functionalities, generally from about 2 to about 3, are also useful in the practice of the present invention.

Preferred polyols include those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, sucrose, various amines and the like.

Preferred are poly(oxypropylene) glycols, triols, tetrols and hexols and any of these that are capped with ethylene oxide. These polyols also include poly(oxypropyleneoxyethylene)polyols. The oxyethylene content should preferably comprise less than about 80 weight percent of the total and more preferably less than about 40 weight percent. The ethylene oxide, when used, can be incorporated in any way along the polymer chain, for example, as internal blocks, terminal blocks, or randomly distributed blocks, or any combination thereof.

The base polyols described hereinabove can contain small amounts of "inherent" unsaturation, i.e., unsaturation due to the isomerization of propylene oxide to allyl alcohol during the manufacture of the polyol. In some cases it may be desirable to include additional unsaturation in the polyols.

Polyamines, amine-terminated polyols, polymercaptans and other isocyanate-reactive compounds are also suitable in the present invention. Another preferred class of polyols includes the "copolymer polyols", which are base polyols containing stably dispersed polymers such as acrylonitrile-styrene copolymers.

Other types of polyols useful in the process of the invention include polyurea polyols, such as are disclosed in U.S. Pat. Nos. 3,325,421; 4,042,537; 4,089,835, polyoxamate polyols, such as are disclosed in U.S. Pat. No. 4,407,983; and polyisocyanate-polyaddition products, such as are disclosed in U.S. Pat. Nos. 4,374,209; 4,324,716; 4,310,448; 4,310,449; 4,305,857; and 4,305,858.

As noted hereinabove, additional formulation components may also be used, and in some cases will qualify as visible emissions producing components. Their status as such can be confirmed by the behavior of the foam; that is, if the presence of the visible emissions reducing agent reduces visible emissions when compared with those emitted by a foam which is prepared from a formulation which is substantially similar but without the visible emissions reducing agent, then a visible emissions producing Component is present in the formulation, regardless of whether it is otherwise identified as an antioxidant, surfactant, catalyst, material having another function, or combination thereof.

One such preferred component is water, which serves as a blowing agent by generating carbon dioxide in reaction with the polyisocyanate, but which may also operate as a visible emissions producing component in some formulations. While auxiliary blowing agents, such as the low-boiling halogenated methanes and other halocarbon and hydrohalocarbon compounds commonly used for blowing by those skilled in the art, including in particular fluorinated and/or chlorinated compounds, can also be employed, a particular advantage of the present invention is that water can be used as the sole blowing agent without encountering the unacceptable exotherm problems or poor physical properties that are conventionally expected in preparing flexible slabstock or molded foams blown using only water.

The formulations of the present invention may also include a catalyst, or a combination of catalysts, which, as noted above, may in some formulations operate as a visible emissions producing component. Those skilled in the art will know that often combinations of catalysts are used to produce the desired amounts, rates and sequencing of urethane formation and blowing, and therefore to control the desired final properties of the polyurethane foam. Such is the case in the present invention, with the understanding that use of the visible emissions reducing agent in combination with the selected visible emissions producing component frequently produces even better physical properties of some types.

Catalysts preferred herein are preferably metal salt catalysts, such as salts of tin, lead or copper. Of these, tin(II) and tin(IV) catalysts are more preferred, and tin(II) catalysts are most preferred. Organo-metallic catalysts, such as organotin catalysts, are also particularly preferred. For example, tin(II) alkanoates such as stannous formate, stannous acetate, stannous propanoate, stannous butanoate, and stannous octoate may all be advantageously used in the practice of the present invention. Other organotin catalysts that may be useful herein include dibutyltin dimaleate, dibutyltin dilaurate, dibutyltin dilauryl sulfide, and dibutyltin oxide are particularly suitable in some formulations.

Other catalysts that can be used include tertiary amines, such as bis(N,N-di-methylaminoethyl)ether, trimethylamine, triethylamine, N-methyl-morpholine, dimethylaminoethyl morpholine, N,N,N',N'-tetramethylhexanediamine, N-ethyl-morpholine, N,N-dimethylethanolamine, N,N,N',N'-tetramethyl-1,3-butanediamine, triethanolamine, 1,4-diazobicyclo-(2,2,2)octane, pyridine oxide, mixtures thereof and the like. Preferred amine catalysts are bis(N,N-dimethylaminoethyl)ether and 1,4-diazobicyclo-(2,2,2)octane. The amine catalysts can be dissolved in solvents, such as glycols including dipropylene glycol, and can be partially neutralized. Such neutralization is commonly done using a carboxylic acid such as formic acid. It is preferred that these catalysts be used in conjunction with the metal salt catalysts, such as the organo-metallic catalysts described hereinabove.

Mixtures of any of the above classes of catalysts can also be employed, in order to optimize the desired final properties of the foam and/or to improve processability.

Surfactants, typically silicone-based surfactants, are also typically used in flexible foam formulations for producing molded or slab foams. Again, in some formulations certain surfactants may also operate as visible emissions producing components. Those suitable for use in the present invention include, for example, "hydrolyzable" and "non-hydrolyzable" polysiloxane-polyoxyalkylene block copolymers, cyanoalkylpolysiloxanes, polydimethylsiloxanes containing minor amounts of other silicon-bonded hydrocarbon substituents (e.g., betaphenylethyl groups) and the like. The use of silicone surfactants increases foam stability in general and produces finer cell structure. The silicone surfactants can be dissolved in solvents such as glycols, or added to the isocyanate-reactive component or the isocyanate component without dissolution.

Finally, additional formulation components may be used. These include those additives and modifiers commonly used by those skilled in the art, such as, for example, pigments, colorants, fillers, flame retardancy agents, ultraviolet light stabilizing agents, mixtures thereof and the like. Such components may or may not be classified in a given formulation as visible emissions producing components.

As is known to those skilled in the art, the proportions of the selected components determine the processing characteristics and physical properties of the final flexible foam. Adjustment of the amounts of each component to achieve a desired characteristic or property will be already within the knowledge of the skilled artisan or will be easily discernible through routine experimentation. However, in general it is preferred that the proportion of the organic polyisocyanate and the isocyanate-reactive compound be such that an isocyanate index of from about 70 to about 130, more preferably from about 80 to about 105, be attained. In particular, the lower isocyanate indices offer the opportunity to alleviate some exotherm problems encountered when a relatively large amount of water is employed as the blowing agent. The reduced indices (those having upper range limits of 105 or less), in combination with the relatively high functionality isocyanate-reactive component, offer improvements in foam quality and processability. Addition of the visible emissions reducing agent may be further synergistic in producing desirable properties.

The proportions of remaining components are then based generally upon the amount of the isocyanate-reactive compound. Thus, it is preferred that the amount of water is from about 2 to about 12 parts, more preferably from about 2.5 to about 6.5 parts, based on 100 parts of polyol. The visible emissions reducing agent is preferably added in an amount from about 0.001 to about 2 parts based on 100 parts of polyol, more preferably from about 0.01 to about 1, and most preferably from about 0.05 to about 0.25 parts. Larger amounts, however, may be particularly desirable when an MDI is selected as the isocyanate component. As noted hereinabove, the antioxidant amount will vary depending upon the antioxidant selected. The catalyst component is preferably present in an amount from about 0.001 to about 5 parts per 100 parts of polyol, more preferably from about 0.001 to about 3 parts. Those skilled in the art will know to adjust the level of catalyst in order to optimize processing of the formulation. The surfactant component, if desired, is preferably present in an amount from about 0.1 to about 5 parts per 100 parts of polyol, more preferably from about 0.5 to about 2.5 parts, for molded foams; or from about 0.3 to about 4 parts, preferably from about 0.7 to about 2.5 parts, for slabstock foams. Other additives and modifiers, such as pigments, colorants, flame retardant additives and fillers, are preferably present in an aggregate amount of less than about 5 parts per 100 parts of polyol.

The formulations of the present invention can be prepared using any of the methods known to those skilled in the art of preparing flexible slabstock or molded foams. Orders of addition can be varied, although it is customary in preparing flexible molded foams for most components particularly including the visible emissions reducing agent, to be blended together with the isocyanate-reactive component prior to its reaction with the polyisocyanate. In preparing flexible slabstock foam a multi-stream method is commonly employed to enable easy formulation adjustment and metering. In this case the visible emissions reducing agent can most conveniently be combined with water as a blowing agent in one stream, while other formulation components are frequently already combined, as purchased, with the isocyanate-reactive component in another stream.

In another embodiment, a visible emissions reducing agent can be selected such that it is soluble in the selected polyol, thereby obviating predissolution in the water. In still another embodiment, the agent, or a portion thereof, can be prepared in situ in the polyol, for example, starting with the presence of a residual alkali metal which may be the result of certain polyol preparation processes. In still another embodiment, the agent can be added in a "carrier stream" of some kind, e.g., as part of a catalyst-containing "third stream". In yet another embodiment, the agent can be added to the isocyanate prior to reaction of the isocyanate with the polyol.

Poly-urethane and/or -urea foams are made almost exclusively by the one-shot process, meaning that the raw materials are either metered as multiple separate streams, as described, to a mix head, or are pre-blended into one of two masterbatches based on the polyisocyanate or the isocyanate-reactive component, which are then combined. The polyisocyanate and isocyanate-reactive component are therefore, in either case, contacted, and the result of such contact is the well-known exothermic polymerization by which poly-urethane and/or -urea polymers are formed. The formulation can then, during or concurrently with initiation of the polymerization reaction, be either poured into a mold or, frequently, used to produce a slabstock foam bun, which is generally done on a continuous foam machine. To prepare molded foams typically a mold is preheated and waxed with a mold release agent, then the formulation components are added and the resulting foam is allowed to cure before being stripped from the mold. Alternatively, discontinuous box foaming can be utilized on a laboratory scale and, in some cases, for low volume specialty grades of foam.

In general temperature control is considered to be important, since the viscosity, density and chemical reactivity of isocyanates and isocyanate-reactive components vary according to the temperature. Preferred processing temperatures for the starting materials range from about 60° F., more preferably from about 65° F., to about 90° F., more preferably to about 75° F. Those skilled in the art will know how to select processing temperatures and pressures according to the requirements of the processing equipment selected. Those skilled in the art will be familiar with these methods and with their variations without further direction herein.

Once the foam starting materials have been prepared and reacted, the foam begins its cure, which is defined herein as the period following the foaming, rise and gellation of the system. During this cure the temperature of the foam continues to increase since the reaction stages are exothermic, to a temperature, for many formulations, ranging from about 100° C. to about 200° C., more preferably 125° C. to 165° C. Allowing the foam to rise to temperatures above about 200° C. tends to increase the degradation of the foam and may even result in spontaneous combustion of the foam. The resultant increased degradation is exhibited as a decrease in physical properties and increase in foam discoloration, which discoloration may occur to some extent even in the presence of an antioxidant or antioxidant package.

In order to reduce or avoid the above-described problems, the use of active cooling procedures has recently been suggested in the art. Such procedures include application of a gas stream, such as a relatively cool air stream, and/or water. Evacuation of the foam has also been taught. These active, rather than passive, means of cooling are termed herein "mechanical cooling". Mechanical cooling causes a particular increase in the level of visible emissions generated by the curing foam, and it is thus the cooling method as to which the method of the present invention exhibits the greatest advantage. Methods and means for mechanical cooling are described in, for example, U.S. Pat. Nos. 5,128,379 to Stone; 5,171,756 to Ricciardi et al.; and 5,188,792 to Drye et al. As suggested by those patents, the nature of the air, water or other stream, where used, may affect the final properties of a foam, and thus, as is generally known to those skilled in the art, it is desirable to select the cooling means to obtain the desired final product, taking into account the nature of the starting materials and other processing conditions.

The following examples are given to more fully illustrate the present invention. As such they are not intended to be, nor should they be construed as being, limitative of its scope in any way. All parts and percentages are based on 100 parts of polyol unless otherwise indicated. As used in the examples, the following terms are defined as follows:

Polyol A is an ethylene oxide/propylene oxide heterofed, sucrose/glycerine-co-initiated polyol of about 1200 equivalent weight and average functionality greater than 3.

Polyol B is an ethylene oxide/propylene oxide heterofed, glycerine-initiated polyol of about 1000 equivalent weight and average functionality of about 2.7.

Polyol C is a proprietary polyol which is an ethylene oxide/propylene oxide heterofed, glycerine-initiated polyol of about 1000 equivalent weight and average functionality of about 2.7 and includes selected antioxidants.

VERA is the visible emissions reducing agent, as identified, which has been predissolved in the water. The pH is adjusted to be near neutral.

Tin Catalyst is stannous octoate T-9 ™, a product of Air Products and Chemicals, Inc.

Amine Catalyst is Dabco ™ 8264, a product of Air Products and Chemicals, Inc.

Surfactant is Dabco ™ DC-5160, available from Air Products and Chemicals, Inc.

Polyisocyanate is an 80/20 mixture of 2,4-toluene diisocyanate and 2,6-toluene diisocyanate, available as Voranate ™ T-80 from The Dow Chemical Company.

Index is isocyanate index, which is defined as the ratio of isocyanate groups to isocyanate reactive groups, multiplied by 100.

Emissions refers to emissions visible to the unenhanced eye. These are arbitrarily quantified for Tables 2 and 3 as "significant visible emissions" (copious white or gray smoke emitted for a specified number of minutes); "visible emissions" (faint smoke); and "no visible emissions" (no smoke whatsoever visible). The foam is subjected to forced cooling using an ambient airstream at an airflow rate of from about 1500 to about 2000 cubic feet per minute.

EXAMPLES 1-9

A series of experiments is done to illustrate visible emissions, using a Varimax ™ 300 pilot "Slabline" (manufactured by Periphlex Ltd.). The equipment is built to industry standards but on a slightly smaller scale, with a block size of 54 inches wide by 96 inches long by 26 to 33 inches high. Operating procedures and parameters are those of production equipment found extensively throughout the United States. Component process temperatures are 70° F.; mix head pressure is held between 4 and 7 psig; conveyor speed is between 11 and 15 feet per minute. The trough size for all of the experiments is 24 liters. Run time per experiment is between 1 and 2 minutes. A five section, 15 feet total length fall plate is used on this machine.

Each of the components of each sample, as shown in Table 1, is metered separately using variable speed direct current motor drives and appropriate pumps for each stream. The VERA, where present, is diammonium pentaborate, which has been predissolved in the water and sufficient boric acid added to adjust the pH to near neutral. The polyol and auxiliary blowing agent are pumped at low pressure. All other streams are injected through high pressure nozzles. The Polyisocyanate pressure is between 600 and 900 psig and is added in an amount to achieve the given Index; all other streams are injected at between 200 and 600 psig. Polyol throughputs for the experiments range between 80 and 100 pounds of polyol per minute.

TABLE 1

| Component | 1 | 2* | 3 | 4* | 5 | 6 | 7* | 8 | 9* |
|---|---|---|---|---|---|---|---|---|---|
| Polyol A | 100 | 100 | — | — | — | — | — | — | — |
| Polyol B | — | — | 100 | 100 | 100 | 100 | 100 | 100 | 100 |
| Water | 6.5 | 6.5 | 6.5 | 6.5 | 6.0 | 6.5 | 6.5 | 6.5 | 6.5 |
| Silicone Surfactant | 1.2 | 1.2 | 1.2 | 1.2 | 1.2 | 1.2 | 1.2 | 1.2 | 1.2 |
| Amine Catalyst | 0.12 | 0.12 | 0.12 | 0.12 | 0.12 | 0.12 | 0.12 | 0.12 | 0.12 |
| Tin Catalyst | 0.21 | 0.21 | 0.21 | 0.21 | 0.21 | 0.21 | 0.21 | 0.21 | 0.21 |
| VERA | 0.15 | — | 0.15 | — | 0.15 | 0.15 | — | 0.15 | — |
| Index | 104 | 104 | 104 | 104 | 90 | 104 | 104 | 104 | 104 |

—indicates not present in formulation.
*indicates not an example of the present invention, included for comparative purposes only.

Following formation of the flexible polyurethane foams the buns were force-cooled as described in the "Emissions" definition. The visible emissions are measured qualitatively as described with the results shown in Table 2. That table shows the reduction in visible emissions attributable to inclusion of the visible emissions reducing agent (VERA) in certain of the foams.

TABLE 2

| | 1 | 2* | 3 | 4* | 5 | 6 | 7* | 8 | 9* |
|---|---|---|---|---|---|---|---|---|---|
| VERA | Yes | No | Yes | No | Yes | Yes | No | Yes | No |
| No Visible Emissions | X | | X | | X | X | | X | |
| Visible Emissions | | | | | | | X | | |
| Significant Visible Emissions | | X | | X | | | | | X |
| Cooling time (minutes) | 25 | 35 | 30 | 40 | 25 | 17 | 21 | 27 | 30 |

X indicates emission category perceived visually without visual enhancement, as defined under "Emissions".
*indicates not an example of the present invention, included for comparative purposes only.

EXAMPLES 10-15

Polyurethane foam formulations are prepared from the components shown in Table 3. The formulation components are mixed using a typical "one-shot" mixing technique in a bench top box foamer. The "B-side", that is, everything except the Polyisocyanate, is mixed at 1,800 rpm for about 15 seconds. The selected visible emissions reducing agent, as shown, is dissolved in the water and the solution then added to the polyol. Polyisocyanate, as defined, is then added to the B-side to achieve the given index, and the combination is mixed at 2,400 for about 3 seconds. The mixed formulation is poured into a lined box to complete foaming and curing. Rise time and emissions are measured as shown in Table 3.

TABLE 3

| Component | 10* | 11* | 12 | 13 | 14 | 15 |
|---|---|---|---|---|---|---|
| Polyol A | 100 | 100 | 100 | 100 | 100 | 100 |
| Water | 6.5 | 6.5 | 6.65 | 6.65 | 6.5 | 6.65 |
| Silicone Surfactant | 1.2 | 1.2 | 1.2 | 1.2 | 1.2 | 1.2 |
| Tin Catalyst | 0.21 | 0.21 | 0.21 | 0.24 | 0.21 | 0.24 |
| Amine Catalyst | 0.12 | 0.12 | 0.12 | 0.12 | 0.12 | 0.12 |
| VERA | — | — | $Al_2(SO_4)_3$ | $Al_2(SO_4)_3$ | Benzoyl Chloride | $KHSO_4$ |
| Index | 104 | 104 | 104 | 104 | 104 | 104 |
| Rise Time (seconds) | 85 | 89 | 200 | 132 | 125 | 200 |
| Comments | Significant visible emissions | Significant visible emissions | Foam collapsed | Visible emissions (faint) | Visible emissions (faint) | Visible emissions (very faint) |

—indicates not present in formulation.
*indicates not an example of the present invention, included for comparative purposes only.

As shown in Table 3, the controls (Examples 10 and 11) had the largest visible emissions level; $Al_2(SO_4)_3$ reduced visible emissions somewhat; $KHSO_4$ reduced visible emissions more than $Al_2(SO_4)_3$; and benzoyl chloride reduced visible emissions the most, for this series of formulations under the processing methods employed.

What is claimed is:

1. In a method of preparing a poly-urethane and/or -urea foam from a formulation including (a) a polyisocyanate, (b) an isocyanate-reactive component, and (c) a visible emissions producing component, wherein (a), (b) and (c) are reacted under reaction conditions sufficient to form a poly-urethane and/or -urea foam and the foam is then cooled, whereby visible emissions are emitted during cooling, an improvement comprising including in the formulation a visible emissions reducing agent, such that the amount of the visible emissions is reduced as compared with the amount emitted by a foam prepared from a formulation which does not contain the visible emissions reducing agent but which is otherwise substantially similar.

2. The method of claim 1 wherein the visible emissions producing component is an antioxidant.

3. The method of claim 2 wherein the antioxidant is selected from the group consisting of sterically hindered phenols, phosphites, thioethers, phosphines, secondary aromatic amines, 6-chromanol derivatives and mixtures thereof.

4. The method of claim 1 wherein the visible emissions reducing agent is selected from the group consisting of (a) alkali metal dihydrogen phosphates and polyphosphates; (b) alkali metal sulfates; (c) aluminum sulfates, phosphates, polyphosphates, borates and alkanoates; (d) ammonium sulfates, phosphates, polyphosphates, borates and alkanoates; (e) acid chlorides; and (f) mixtures thereof.

5. The method of claim 4 wherein the visible emissions reducing agent is selected from the group consisting of diammonium pentaborate, diammonium tetraborate, potassium dihydrogen phosphate, benzoyl chloride, aluminum sulfate, potassium hydrogen sulfate, and mixtures thereof.

6. The method of claim 1 wherein the polyisocyanate is selected from the group consisting of aliphatic, aromatic and cycloaliphatic polyisocyanates containing at least two isocyanate groups.

7. The method of claim 6 wherein the polyisocyanate is selected from 2,4-toluene diisocyanate, 2,6-toluene diisocyanate, methanediphenyl diisocyanate, polymeric poly(methylene polyphenylene-isocyanate), and mixtures thereof.

8. The method of claim 1 wherein the isocyanate reactive component is selected from the group consisting of (a) alkylene oxide adducts of polyhydroxyalkanes; (b) alkylene oxide adducts of non-reducing sugars and sugar derivatives; (c) alkylene oxide adducts of phosphorus and polyphosphorus acids; (d) alkylene oxide adducts of polyphenols; (e) polyamines; (f) amine-terminated polyols; (g) polymercaptans; (h) copolymer polyols; and (i) mixtures thereof.

9. The method of claim 1 further including (d) a blowing agent.

10. The method of claim 9 wherein the blowing agent is water.

11. The method of claim 1 wherein cooling is done mechanically using a gas stream or water.

12. A poly-urethane and/or -urea foam made from the method of claim 1.

* * * * *